United States Patent Office 3,438,374
Patented Apr. 15, 1969

3,438,374
METHOD OF BONDING TISSUE SURFACES AND CONTROLLING HEMORRHAGING THEREOF USING A TISSUE ADHESIVE AND HEMOSTATIC COMPOSITION
Richard D. Falb and Charles W. Cooper, Columbus, Ohio, assignors to the United States of America as represented by the Secretary of the Department of Health, Education, and Welfare
No Drawing. Filed Feb. 28, 1966, Ser. No. 530,393
Int. Cl. A61b *17/04;* A61l *17/00;* C08h *7/00*
U.S. Cl. 128—334            11 Claims

ABSTRACT OF THE DISCLOSURE

A method of bonding traumatized tissue surfaces and controlling hemorrhaging therefrom is disclosed. An adhesive comprising a mixture of a soluble proteinaceous prepolymer such as gelatin, a modifying agent in the form of a phenol derivative, and an aldehyde cross-linking agent is applied to the surfaces to be bonded and cross-linking is effected. The adhesive provides an extremely strong bond.

---

This invention relates to tissue adhesives and hemostatic agents and processes for using the same, and relates more particularly to improved systems for bonding traumatized tissue surfaces and controlling hemorrhaging therefrom.

Tissue adhesives have widespread potential applicability in surgery and recent interest in the applications of such materials has been widespread. The more promising suggestions of the prior art include cross-linked gelatin-formaldehyde systems, isocyanate polyurethane systems and cyanoacrylate systems. However, all of the materials currently available suffer from significant disadvantages.

In general, the desiderata commonly considered necessary for a fully satisfactory surgical adhesive might be listed as follows:

(1) The bonding material should have high initial tack.
(2) It should bond rapidly to living tissues.
(3) The strength of the bond should not be altered by the presence of some degree of moisture.
(4) The adhesive composition should be insoluble or only slowly soluble in bodily fluids.
(5) The constituents of the composition should be relatively nonirritating locally, at least in the amounts required to effect the desired bond.
(6) Similarly, the constituents should be relatively non-toxic systemically in the amounts necessary for use.
(7) The strength of the bond should be of such a magnitude that tissue failure will occur under challenge before bond failure.
(8) The bond should preferably be relatively flexible.
(9) The tissue adhesion effected and the compositions themselves should be consistently uniform and reproducible from batch to batch.
(10) The bonding materials should have good shelf life.
(11) The costs of the chemical constituents and procedures to be utilized should be relatively economical.

All of the commercial surgical bonding materials presently on the market fail to satisfy one or more of the above requirements. Quite frequently, such compositions have poor initial tack and decreased bond strength in the presence of moisture.

In order to be fully satisfactory as a biological cement or hemostatic agent, a surgical adhesive must be effective on moist, as well as relatively dry, tissue surfaces. Further, an ideal bond is charatcerized by the occurrence of tissue failure, with actual tearing away of the individual fibers from one and another, in contrast to be separation of the adhesive layer from the underlying tissue, more commonly seen when the presently available bonding means are used.

Certain of the surgical materials based on gelatinous sponges have a tendency to become mechanically, dislodged unless held in position for prolonged times necessary for a fibrin clot to entrap the sponge in the area of a trauma.

Finally, some of the prior art materials exhibit variable potency between batches and relatively poor shelf life.

Considering the above, it is a primary object of this invention to provide tissue adhesive and hemostatic compositions and procedures for using the same which satisfactorily provide all of the above desiderata and overcome the various disadvantages inherent with presently available prior art systems.

Thus, it is a basic object of this invention to provide a tissue adhesive and hemostatic agent and procedures for utilizing the same which will relatively rapidly provide high strength bonds between living tissues whether or not moisture is present in the environment. Further, it is a significant objective of this invention to provide a surgical adhesive of the type described which will form bonds on the order of magnitude of the cohesive forces possessed by the collagen which normally forms part of the cellular cement holding natural tissue cells together and which, in fact, is chemically similar to the connective tissue of the body thereby simulating naturally occurring fibers.

Another important object of the instant invention is the provision of an adhesive system utilizing small quantities of chemical constituents in amounts which are relatively non-irritating locally and relatively non-toxic systemically in the amounts required and wherein the adhesive is removed by body fluids after the tissue regenerates.

Additionally, it is a further object of this invention to provide an adhesive system having functional characteristics which may be consistently reproduced and which has good shelf life.

Still further, this invention contemplates the provision of various procedures for utilizing the tissue adhesives which are relatively simple, yet highly reliable and efficient, and which, in certain instances, provide techniques for obviating tissue irritation where the situs of the trauma is particularly sensitive.

Other and further objects reside in the combination of chemical constituents in the composition and in the functional characteristics of the same as well as in the manipulative steps of the procedures. Still other objects will in part be obvious and in part be pointed out as the description of the invention proceeds.

It has now been found that all of the above advantageous characteristics can be provided by utilizing a surgical adhesive and hemostatic agent composition according to this invention which is based on (1) A soluble proteinaceous prepolymer which can be insolubilized to form a gel matrix, e.g., gelatin, collagen and artificial polypeptides, (2) A cross-linking agent which cross-links the protein and binds it to the tissue, e.g., various aldehydes such as formaldehyde, glutaraldehyde, glyoxal, adipaldehyde and polyacrolein, and (3) A water-resisting agent which reacts with the protein and the cross-linking agent to produce a water-insoluble polymer, thus rendering the gel water-resistant, e.g., phenol derivatives such as resorcinol, phloroglucinol, hydroquinone, β-naphthol and 1,3-dihydroxynaphthalene.

Although initial studies indicate the various above-listed materials will provide satisfactory results, the preferred adhesive consists of gelatin and resorcinol cross-linked with formaldehyde and therefore the major portion of this specification will be directed to this composition. However, it is to be understood that other equivalent materials such as those discussed above could be substituted for the preferred constituents without departing from the basic concept of this invention.

The composition of this invention produces a bond of exceptional high tensile strength even in the presence of moisture, the adhesive having high initial tack with the cross-linking occurring relatively quickly, generally within two to three minutes whereby hemostasis and tissue bonding may be effected rapidly.

Natural tissue fibers are composed mainly of polypeptide chains. Gelatin such as is used in the adhesive of this invention is a naturally occurring protein closely resembling the connective tissues chemically and having innate adhesive properties, whereby an optimum bonding system simulating nature is provided. Hydrogen bonding between the cross-linked gelatin and the tissues is thought to be one of the factors responsible for the adhesive properties of the composition of this invention.

The presence of resorcinol has been found to improve the moisture resistance of the final product, a cross-linked gelatin mixture, because it rapidly forms a polymer with the aldehyde cross-linking agent. Further, the addition of resorcinol to the composition provides substantially increased bond strength and reliability in use. Moreover, since both formaldehyde, the aldehyde utilized in most applications of the composition of this invention to date, and resorcinol are germicidal agents, the adhesive is believed to assist in preventing infection at the site of application.

Although the useful quantitative ratio between the constituents of the composition of this invention has not been found to be particularly critical, optimum functional characteristics are realized with a composition wherein the gelatin predominates in the gelatin-resorcinol mixture, the preferred composition containing approximately 2 to 5 parts by weight of gelatin for each part by weight of resorcinol. To this material an effective quantity of an aldehyde is added to produce the desired cross-linking reaction.

Lower concentration of gelatin produces relatively poor cross-linked gels. On the other hand undue proportions of gelatin result in undesirably high viscosity. Similarly, too small a quantity of resorcinol will not produce satisfactory gels which are resistant to body fluids and maintain strong bonds for long periods while high concentrations of this material cause a brittle gel. Sufficient formaldehyde must be present to effect cross-linking, but too high a concentration may cause tissue irritation. Thus, while proportions are not critical, certain practical ranges exist for the production of optimum results.

Although the major portion of the development work on the composition of this invention has been carried out utilizing a U.S.P. 37 percent formaldehyde (formalin) solution, other aldehydes, or other concentrations of formaldehyde, preferably in excess of 10 percent, possibly less toxic in certain applications have been found to produce satisfactory results. For example, commercially available 25 percent solutions of glutaraldehyde and 18 percent solutions of formaldehyde will provide effective cross-linking. Other comparable aldehydes may also be substituted as the cross-linking agent.

The basic gelatin-resorcinol mixture for the composition of this invention may be formed in any desired manner. Generally, U.S.P. grade gelatin and resorcinol flakes or crystals are weighed out and water is added preferably to form a 40 to 70, more preferably 60 to 70 weight percent total solids content in the solution. Various types of gelatin have been used with equivalent results such as a conventional photographic grade of material, a 275 bloom, type A, a 90 bloom, type B, and an acrylated gelatin of the type shown in U.S. Patent No. 2,548,520.

The gelatin-resorcinol mixture may be stored indefinitely, six months' storage, for example, having shown no substantial detrimental effects. When the gelatin-resorcinol mixture is to be used it is warmed to approximately 40° C. to convert the gel to a semi-liquid sol state and reacted with the aldehyde to effect cross-linking before the mixture cools and gels. The material may be sterilized before use, if desired, by electron beam or any other conventional sterilization technique.

The simplest procedure for utilizing the tissue adhesive and hemostatic agent of this invention is to cross-link the gelatin-resorcinol mixture with the aldehyde in situ at the traumatized tissue site by merely treating the tissue surfaces with a few drops of formalin, for example, prior to application of the gelatin-resorcinol mixture, followed by adding a few additional drops of formalin to the mixture after the application of the same to the tissue surfaces. In this manner the cross-linking reaction is initiated in situ quickly and efficiently. If desired, proximal tissue surfaces can be compressed either manually or otherwise to provide temporary hemostasis for the 2–3 minutes required for the aldehyde to cross-link the gelatin-resorcinol mixture.

Although the composition of the instant invention is useful as a tissue adhesive and hemostatic agent in substantially all applications, tissue irritability did present a problem in certain experiments in the present study, e.g., in the closure of blood vessels and bronchi, but healing was not affected on the more parenchymatous organs such as the heart and lungs. Apparently, the formaldehyde, a protein precipitant, is more toxic to certain types of tissues than to others, particularly elastic fibers and cartilage cells. The degree of irritability appeared to relate in part to the vascularity of the tissue to which it was applied. Presumably, the excess formaldehyde is washed away more rapidly and its duration of action decreased when there is abundant circulation to a local area. Studies of kidney, liver and intestine bonds, where the local reaction is not excessive, tend to substantiate this observation and lead to the conclusion that although the composition of this invention used in the simplest manner described above is of general utility, it is most satisfactory as a tissue cement and hemostatic agent in selected applications.

In order to reduce possible irritation in sensitive tissues a preferred procedure for utilizing the composition of the instant invention has been developed wherein it is unnecessary to place the concentrated formalin directly on the tissue at the time of use. Since the cross-linking of gelatin by an aldehyde is pH dependent, the pH controlling the speed a swell as the completeness of the chemical reaction, it has been found that an inactivated adhesive composition may be formed by acidifying the mixture of gelatin and resorcinol whereby a cross-linking quantity of aldehyde may be added to the gelatin-resorcinol mixture without initiating the cross-linking reaction. Acidification is carried out to lower the pH to below about 5.5 preferably to about 3 or 4 and may be effected in any desired manner, for example, by utilizing a 0.1 N hydrochloric acid solution or other conventional acidic material.

The acidified gelatin-resorcinol mixture having the preferred composition of 2 to 5 parts gelatin by weight for each part by weight of resorcinol will generally require approximately 0.3 part by weight of formaldehyde to render the same suitable for subsequent cross-linking. When employing this acidified, inactivated, gelatin-resorcinol-formaldehyde solution, the tissue may be pretreated with a weak base, such as sodium borate or dilute ammonia solution, or the applied inactivated composition may be subsequently treated with the weak base to raise the pH of the composition in situ to in excess of about 6.5 thereby activating the same and initiating the cross-linking reaction. Other weak bases well known in the art may be satisfactorily utilized to raise the pH in situ and trigger the cross-linking reaction, such as, for example, sodium bicarbonate powder which may be blown over the tacky adhesive in a fine spray from an atomizer bottle.

Further, it is possible that in vivo use of this acidified adhesive may provide an automatic in situ activation since the pH of blood and other body fluids is in the range of 7.3 to 7.4. However, in the event such a procedure is not sufficiently rapid, the addition of a weak base will be effective.

In any event, the above procedural modification allows for effective cross-linking of the gelatin-resorcinol mixture to provide a good bond of a magnitude of the order of the basic procedure described previously, while reducing the total amount of aldehyde necessary and while precluding the necessity of directly applying the concentrated formalin to the traumatized tissue.

Having now generally described the tissue adhesive and hemostatic composition of the instant invention and various procedures for utilizing the same, the following examples are set forth in order to more clearly illustrate and define the basic concepts of the instant invention.

EXAMPLE 1.—IN VITRO TESTS

In order to comparatively test the new materials initially, a simple apparatus was devised which permitted an evaluation of the relative bond strengths produced in vitro. Basically, the apparatus consisted of a geared motor, a set of clamps and a spring balance graduated in grams. The motor was set so that it slowly drew cemented cylindrical one-half inch beef tissue plugs apart at the steady rate of 5 inches per minute, and the reading on the spring balance gave a measurement of the strength of the bond at failure. Duplicate samples of cemented muscle plugs were placed in Ringer's solution to simulate more closely conditions in vivo, these samples being tested after 18 to 24 hours of immersion.

In the case of the gelatin-resorcinol-formaldehyde adhesive of the instant invention, a solution having a gelatin-resorcinol weight ratio of 3 to 1 and a solids content of 60–70 percent, was first formed. A few drops of 37 percent U.S.P. formaldehyde were applied with a medicine dropper to the tissue surface being bonded. The gelatin-resorcinol mixture was warmed on a heating plate until the gelatin melted and the semiliquid solution was then applied over the incised tissue with a warmed medicine dropper. One or two more drops of formalin were then added to the adhesive composition before it cooled and the bond was challenged.

The above adhesive bond was compared with similar test samples utilizing (a) a commercially available isocyanate polyurethane adhesive, (b) a commercially available cyanoacrylate adhesive, and (c) a commercially available cross-linked gelatin-formaldehyde adhesive. The results are set forth below in Table 1 wherein the average bond strengths of ten samples are indicated in grams/cm.$^2$.

TABLE 1

| Adhesive | 5 min. | 15 min. | 1 hr. | 18 hrs.[1] |
|---|---|---|---|---|
| Isocyanate polyurethane | No bond | 215±30 | 350±32 | 550±50 |
| Cyanoacrylate | 80±22 | 118±21 | 200±28 | 200±30 |
| Gelatin/formaldehyde (37%) | 190±33 | 400±50 | 460±60 | 235±60 |
| Gelatin/resorcinol formaldehyde (37%) | 265±55 | 500±52 | 625±50 | 930±120 |

[1] In Ringer's solution.

The above in vitro test results clearly demonstrate that the initial bond strength of the gelatin-resorcinol-aldehyde system of the instant invention are substantially greater than those of the prior art materials. Although the gelatin-formaldehyde system itself, without resorcinol, was much greater than the other two prior art adhesives, at least initially, it will be seen that after 18 hours of immersion in Ringer's solution, the bond strength of such a system decreased substantially and only when the resorcinol was included according to the instant inventive concept, did the bond strength increase with time and immersion.

Although the various prior art materials are useful as tissue adhesives, the disadvantages mentioned hereinabove have limited their more widespread clinical use. The poor initial tack and relatively poor bond strength in the presence of moisture evidenced by these materials are serious drawbacks. Moreover, the actual strength of the bond realized is somewhat limited with adhesives commercially available heretofore. Further, as mentioned previously, an ideal bond is characterized by the occurrence of tissue failure when challenged before bond failure. In the investigation described above, actual tearing of the tissue was noted with the samples bonded with the composition of the instant invention, whereas such a condition was not realized with prior art adhesives. Further, variable potency from batch to batch and limited shelf life, found with at least some of the previously available adhesives, were not observed with the system of the instant invention.

In devising the screening test employed above, the obvious shortcomings of using plugs of dead tissue instead of living organs were apparent. However, by considering the performance of the samples on a comparative basis, it was possible to compensate to a major extent for the deficiencies of the in vitro studies.

EXAMPLE 2.—IN VIVO TESTS

Group I

The ability of the adhesive composition of the instant invention to seal the atrium or ventricle was evaluated in 20 mongrel dogs. The heart was exposed through a lateral thoracotomy incision, an occlusion clamp applied to the heart, and a 1½ centimeter incision made in the excluded portion of the atrium in 13 dogs and in the right ventricle in 6. The cut surfaces were reapproximated with the adhesive without additional reinforcement. After a 3 minute waiting period, the clamp was removed from the heart.

Group II

In 9 animals, air leaks were sealed and bleeding controlled by applying the adhesive to a traumatized area several centimeters in length on the surface of the lung.

Group III

The adhesive of this invention was used as a hemostatic agent to seal a 1 centimeter stab wound in the wall of the descending aorta in 6 dogs. The aorta was cross-clamped, the adhesives applied, and after several minutes the clamps were removed and the chest closed.

Group IV

A right or left upper pulmonary lobectomy was performed in 35 dogs to evaluate the usefulness of the adhesive of this invention in closing the bronchus. The adhesive was used without reinforcement to seal the clamped bronchial stump in 23 animals. In 11, a single interrupted 3–0 silk suture was used to approximate the edges before applying the adhesive.

Group V (A) In 12 chronic experiments a 3 x 2 centimeter portion of liver was excised and in 11 experiments a portion of the lower pole of the kidney was amputated. Large arteries on the cut surface of the injured organ were ligated. The proximal parenchyma of the liver or kidney was manually compressed to provide temporary hemostasis, and a few drops of 37 percent formaldehyde U.S.P. were applied to the tissue surface. The semiliquid gelatin-resorcinol mixture, which had been converted from the gel state to the sol state by warming to 40° C. was applied to the tissues with a warmed medicine dropper. One or two additional drops of formaldehyde were then added to the mixture. After two to three minutes, when an effective bond had been established, the manual compression was released.

In two of the animals, contrilateral nephrectomies were performed one month after application of the adhesive to the kidney.

(B) In 5 acute experiments, the liver and kidney were injured as described in (A) above. In these animals, however, concentrated formalin was not applied directly to the tissue surface, but was incorporated in an acidified gelatin-resorcinol mixture (5 ml. of semiliquid gelatin-resorcinol acidified to a pH of 4 with 0.1 N-hydrochloric acid, and 3 drops of 37 percent formaldehyde). The adhesive was then painted on the injured liver or kidney with an applicator stick and a fine spray of sodium bicarbonate powder was blown over the tacky adhesive from an atomizer bottle in order to raise the pH to in excess of 6.5 in situ and trigger the cross-linking reaction.

RESULTS

Group I

Twelve of the 13 animals in which the atrium was sealed with the adhesive of this invention and 6 of the 7 dogs in which the ventricle was sealed were alive and well at the time of sacrifice three to six months post operatively. In all, adhesions around the heart were minimal and the atriotomy was well healed. No thrombus was present within the heart. There was a whitish scar evident in the region of the induced trauma, but the endothelial surface was covered with a smooth lining. Some of the residual gelatin could still be identified externally up to four months, but by six months, none was evident on gross examination. The atriotomy and ventriculotomy were intact in two dogs which died of pneumonia two weeks postoperatively.

Group II

All 9 animals in which the adhesive of this invention was used to seal the lung parenchyma has uncomplicated courses and were well when sacrificed three to five months later. In some instances, the lung was adherent to the chest wall at the site of application of the adhesive. The lobe was well expanded with some localized parenchymal scarring at the vicinity of application of the adhesive.

Group III

The adhesive of this invention was effective in controlling hemorrhage from the thoracic aorta in all 6 dogs in which it was employed. Five of the animals were well at the time of sacrifice three to five months postoperatively. However, in each of the five dogs, gross examination of the aorta lumen showed a small area of aneurysmal dilation 0.5 centimeter in diameter limited to the area of application of the adhesive. Over its internal surface, a purplish discoloration was evident which was caused by residual periaortic hematoma in the thinned aorta wall, and was still present up to ten months following the operation. No thrombus was present within the lumen. Although the localized area of aneurysmal dilation was still evident five months after operation, healing of the aorta wall had progressed sufficiently so that the purple color could no longer be seen. The aorta was noted to be intact in one dog which died of a pulmonary embolus one week postoperatively.

Group IV

The adhesive was not found to be effective in sealing the divided bronchial stumps in the majority of animals tested using this method. In all, the immediate result was satisfactory, the glue adhering well and sealing the divided bronchus. However, most animals died within one week of operation, following rupture of the bronchial stump. Of the 24 animals in which the adhesive alone had been employed, only 5 lived three months. In the dogs in which a supplementary suture was used in addition to the adhesive of this invention, there was a 50 percent mortality within the first two weeks following operation. Five healthy animals were sacrificed one to three months after operation. Gross pathological examination indicated that as the gelatin softened after several days, the stiff cartilage in the bronchial wall tended to resume its former round shape, separating the cut margins of the stump and placing additionaly stress on the adhesive bond. Healing of the stump in the chronic survivors was poor, even after one to three months. The thin semitransparent layer of tissue covering the gelatin within the bronchus was friable, and a probe could easily be pushed through the healing stump with minimal pressure.

Thus, in this instance, although some evidence of adhesion was realized, particularly when supplementary sutures were utilized, satisfactory results could not generally be obtained. Similar difficulties were found in treating blood vessels where only base line satisfactory results could be achieved. It is believed that one major cause for such unsatisfactory results is the application of the concentrated formalin directly to the traumatized tissues and resultant irritation of the same. Use of the deactivated adhesive as described with reference to Group V (B) above will avoid the phenomenon at the treated site, and satisfactory results with such a modified procedure can be expected. Similarly, substitution of a less toxic aldehyde in these instances may avoid the difficulties encountered with the use of formalin.

Group V (A) Two animals died of wound infections in the immediate postoperative period. Twenty-one were sacrificed at regular intervals one to six months postoperatively, and all were healthy at the time. At autopsy a few filmy adhesions were present about the operative site. The surface of the kidney and liver were well healed. Some residual gelatin was still evident on the surface of the liver three months after operation, and up to four months postoperatively on the renal surface. By six months, only a scar was evident at the site of the trauma. The two animals in which contralateral nephrectomies were performed, remained alive and well two months after application of the adhesive and one month after removal of the kidney.

(B) The tensile strength of the bond achieved with the acidified or inactivated gelatin-resorcinol-formaldehyde composition was comparable to that noted when the formaldehyde was applied directly to the tissue; bond strength increased progressively with time. Hemostasis was achieved within two to three minutes in every experiment following the elevation of the pH with the bicarbonate. The total amount of formaldehyde utilized with this method of application was considerably less than in the experiments described under (A) above in which formaldehyde was placed directly on the organ. In addition, accidental application of formaldehyde, by spillage onto adjacent tissues, was obviated.

MICROSCOPIC EXAMINATION

On microscopic examination of the heart, lung, bronchus and aorta, small foci of residual gelatin could be identified after six months postoperatively, although the amount of visual gelatin decreased with time. The masses of gelatin gradually fragmented and were penetrated by an ingrowth of dense fibroblastic tissue. The early acute polymorphonuclear leukocytic invasion was soon replaced by a chronic inflammatory type of response with small round cells predominating. The cellular response was similar to that which occurs when cross-linked gelatin such as Gelfoam or cat gut are embedded in the body. No foreign body giant cells were present. A small zone of focal cellular necrosis, several mm. in width, was often evident at the site of application of the formaldehyde, and in some instances, the fibroblastic reponse tended to encapsulate the adhesive.

Histologic study of the aorta at the site of injury indicated that the formaldehyde produced a change in the configuration of the elastic fibers. They lost their normal wavy configuration and became straight eosinophilic fibers. This loss of elasticity was responsible for the localized aneurysmal dilation of the vessel wall seen grossly.

No regeneration of new cartilage was evident on cross-section of the bronchial stumps. Only a very loose mesenchymal connective tissue united the divided ends of the bronchus.

In the kidney and liver studies, small foci of residual gelatin could be identified up to six months postoperatively. An acute polymorpholeucocytic invasion was seen in the first few weeks, followed by a chronic inflammatory response, findings similar to those which occurred after the implantation of cross-linked gelatin or cat gut. The masses of gelatin gradually fragmented and were slowly removed by macrophages over the ensuing months. A small zone of focal cellular necrosis was often evident at the site of application of the formaldehyde, and in some instances, ingrowths of fibroblasts between the particles of fragmented gelatin tended to encapsulate the area as healing progressed.

The above test results evidence the fact that the tissue adhesive of the instant invention will form exceedingly strong bonds, even in the presence of moisture. The difficulties encountered applying concentrated formaldehyde directly to the tissues can be overcome with the modified procedure. Moreover, substitution of other aldehydes, somewhat less toxic than formaldehyde, may be expected to entirely avoid such problems.

In general, a new biological cement has been shown to be highly useful and has functioned as a hemostatic agent to control bleeding from various sources. The tensile strength of bonds obtained with this adhesive was greater than could be realized with prior art materials and hemostasis was achieved in all experiments. Systemic and local tissue irritability was generally negligible, particularly when the total concentration and quantity of formaldehyde utilized to cross-link the adhesive was reduced by altering the pH of the system prior to application.

Thus, it will now be seen that there is herein provided improved tissue adhesive and hemostatic compositions and procedures for using the same to bond tissue surfaces and control hemorrhaging, all of which satisfy the objectives of the instant invention, and others, including many advantages of great practical utility and commercial importance.

Since many embodiments may be made of the instant inventive concepts, and since many modifications may be made of the embodiments hereinbefore described, it is to be understood that all matter herein is to be interpreted merely as illustrative and not in a limiting sense.

Accordingly what is claimed is:

1. A process for bonding tissue surfaces and controlling hemorrhaging comprising the steps of:
   (a) providing a mixture of a soluble proteinaceous prepolymer and a modifying agent which reacts with said prepolymer and an aldehyde cross-linking agent to produce a water-resistant gell;
   (b) said prepolymer being selected from the group consisting of gelatin, collagen and artificial polypeptides;
   (c) said modifying agent being selected from the group consisting of resorcinol, phloroglucinol, β-naphthol and 1,3-dihydroxynaphthalene;
   (d) bringing together the tissue surfaces to be bonded;
   (e) applying said mixture to said tissue surfaces; and
   (f) cross-linking said mixture in situ on said tissue surfaces with an effective quantity of said aldehyde cross-linking agent;
   whereby said tissue surfaces are bonded and hemorrhaging is controlled.

2. The process of claim 1 wherein said aldehyde cross-linking agent is selected from the group consisting of formaldehyde, glutaraldehyde, glyoxal, adipaldehyde and polyacrolein.

3. The process of claim 1 wherein said mixture as formed is in a gel state, further including the steps of converting said mixture to a semiliquid sol state prior to application to the tissue surfaces by warming said mixture, and cross-linking said mixture before the same cools and returns to the gel state.

4. The process of claim 1 further comprising the step of compressing proximal tissue surfaces to provide temporary hemostasis prior to application and cross-linking of said mixture.

5. The process of claim 1 wherein said prepolymer is gelatin, said modifying agent is resorcinol and said aldehyde cross-linking agent is formaldehyde.

6. The process of claim 5 wherein said mixture comprises approximately 2 to 5 parts by weight of gelatin for each part by weight of resorcinol.

7. The process of claim 5 further including the steps of treating said tissue surfaces with a few drops of formalin prior to application of said mixture of gelatin and resorcinol and adding a few additional drops of formalin to said mixture after application to said tissue surfaces, thereby initiating cross-linking in situ.

8. The process of claim 5 further comprising the steps of acidifying said mixture of gelatin and resorcinol to a pH of less than approximately 5.5, adding a cross-linking quantity of said formaldehyde thereto to form an inactivated gelatin-resorcinol-formaldehyde mixture, applying said inactivated mixture to said tissue surfaces and raising the pH of said inactivated mixture to in excess of approximtely 6.5 to activate the same and thereby initiate cross-linking in situ.

9. The process of claim 8 wherein said cross-linking quantity of formaldehyde is approximately 0.3 part by weight for each part by weight of resorcinol.

10. The process of claim 8 further including the step of pre-treating said tissue surfaces with a weak base prior to application of said inactivated mixture whereby the pH of said inactivated mixture is raised to in excess of approximately 6.5 and cross-linking is initiated in situ immediately on application of said inactivated mixture to said tissue surfaces.

11. The process of claim 8 further including, after applying said inactivated mixture to said tissue surfaces, the step of adding a weak base thereto to raise the pH of said inactivated mixture to in excess of approximately 6.5, thereby inviting cross-linking in situ.

References Cited

UNITED STATES PATENTS

| | | | |
|---|---|---|---|
| 2,414,415 | 1/1947 | Rhodes | 260—7 X |
| 3,221,745 | 12/1965 | Coover et al. | 128—334 |
| 3,223,083 | 12/1965 | Cobey | 128—334 X |
| 3,264,249 | 8/1966 | Araki et al. | 128—334 X |

OTHER REFERENCES

Chem. Abstracts, vol. 54; 20014 (i).
Chem. Abstracts, vol. 54; 19117 (i).
Chem. Abstracts, vol. 65; 14289 (f).

DALTON L. TRULUCK, *Primary Examiner.*

U.S. Cl. X.R.

260—7